United States Patent Office 3,733,345
Patented May 15, 1973

1

3,733,345
ORGANO-MOLYBDENUM PHOSPHORODITHIO-ATES AND METHOD FOR PRODUCING SAME
Vincent Chiola, Towanda, Phyllis R. Dodds, Wysox, and Tai K. Kim, North Towanda, Pa., assignors to GTE Sylvania Incorporated
No Drawing. Continuation-in-part of application Ser. No. 757,786, Sept. 5, 1968. This application Aug. 10, 1970, Ser. No. 62,667
Int. Cl. C07f 11/00
U.S. Cl. 260—429 K     4 Claims

ABSTRACT OF THE DISCLOSURE

Organo-molybdenum phosphorodithioates which contain the desired organic, molybdenum, phosphorus and sulfur groups useful as additives to an oil of lubricating viscosity, are disclosed and a process for preparing same, which process comprises contacting an aqueous solution containing the phosphorodithioic acid and an organic solvent, thereby extracting the molybdenum into the organic solution and thereafter removing the organic solvent to thereby recover the molybdenum phosphorodithioates.

CROSS-REFERENCE TO RELATED APPLICATION

This application is a continuation-in-part application which discloses and claims the subject matter of a co-pending application of Vincent Chiola, Phyllis R. Dodds and Tai K. Kim entitled "Molybdenum Phosphorodithioates and Method for Producing Same," Ser. No. 757,786, filed Sept. 5, 1968, now abandoned, and assigned to the same assignee as the present invention.

BACKGROUND OF THE INVENTION

This invention relates to certain new organo-molybdenum phosphorodithioates, to a process for producing same and to lubricating oil compositions containing said new compounds. More particularly, it relates to oil-soluble organo-molybdenum phosphorodithioates having a unique molecular arrangement.

Present day lubricating oils contain various additives that impart to the composition desirable characteristics such as detergency, antioxidant, antisludge, anticorrosion and antiwear properties. Until recently, it has been necessary to add several additives to achieve a suitable composition. For example, zinc dialkyldithiophosphates, which are produced by neutralizing the reaction product of phosphorus pentasulfide and an alcohol with sodium hydroxide and thereafter replacing the sodium ions with zinc ions in an aqueous medium, impart some of the above characteristics such as antioxidant, antiwear and anticorrosion activity. Other materials such as the amine salts of molybdic or tungstic acid are used to impart sludge dispersancy, high temperature detergency and antifriction properties. Other additives which are used include the adducts of the zinc, phosphorothiates and alkylene oxides such as the lower alkylene oxides having an alkylene radical containing 6 or less carbon atoms. The materials are used to impart improved detergency and corrosion resistance to the oil composition. In many instances, however, more than one additive is required to achieve several desired characteristics.

The need for a single compound that would provide more of the desired functional groups was recognized and provided by a material and a process disclosed in U.S. Pat. 3,400,140. The material disclosed therein contains the same elements as the compositions of the present invention, however, a different molecular arrangement is present as evidenced by different infrared absorption patterns. Additionally, the process disclosed therein involves dissolving molybdic oxide in a hydroxide, adding sulfuric acid to the resultant solution and thereafter adding the phosphorodithioic acid to the acidified solution, refluxing at 85° C. to 100° C. for 1 to 5 hours and thereafter separating the sulfurized oxymolybdenum organophosphorodithioate from the aqueous phase.

Also, in U.S. Pat. 3,402,188 materials are disclosed that contain hydrocarbon radicals and the elements of sulfur, phosphorus and molybdenum. These materials are prepared by forming an aqueous solution of a metal salt of a organo-phosphorodithioic acid and thereafter adding a salt of molybdic acid to the aqueous solution, and thereafter adding an acid to achieve an acidic pH, extracting with an organic extractant and separating the organic material from the water and distilling off the extractant. This material also contains the same elements as the material disclosed in U.S. Pat. 3,400,140 and the present invention, however, the material disclosed in U.S. Pat. 3,402,188 is different from those previously mentioned as evidenced by the infrared absorption patterns which indicate the presence of different functional groups in each material.

It is believed, therefore, that a relatively simple process that provides a now organo-molybdenum phosphorodithioate composition that can be conducted at room temperature and with a minimum number of process steps would be an advancement in the art. Additionally, it is believed that a lubricating composition containing an additive having the desirable organo, molybdenum, phosphorous and sulfur functional groups would be an advancement in the art.

SUMMARY OF THE INVENTION

In accordance with one of the aspects of this invention, there is provided a composition having a hydrocarbon radical selected from the group consisting of alkyl, aryl and alkyl having from 1 to 30 carbon atoms sulfur, phosphorus, molybdenum and oxygen and having a unique infrared absorption pattern as hereinafter described and compared to prior art compositions. In accordance with an additional aspect of this invention the process for preparing said compositions comprises:

(1) Contacting an aqueous medium containing water and a water soluble molybdenum source, said aqueous medium being at a pH of below 7, preferably from about 0 to about 4.5, with an organic medium comprising a phosphorodithioic acid dissolved in a water-immiscible organic solvent for a time sufficient to extract at least some of the molybdenum from said aqueous medium into said organic medium;

(2) Separating the organic and aqueous media;

(3) Removing the organic solvent from the organic medium thereby recovering the compositions of this invention.

Molybdenum-containing compositions of this invention are produced when the process is conducted in accordance with this invention, however, other similar metals can not be substituted for molybdenum with the same results. For example, when a tungsten source which is also a Group VI-B transition metal, is susbtituted for a molybdenum source in the process of this invention tungsten is not extracted from the aqueous media into the organic media, therefore, the corresponding tungsten compounds are not formed.

The compositions of this invention do not have the same infrared absorption pattern as the compounds disclosed in U.S. Pats. 3,400,140 and 3,402,188 that also contain hydrocarbon radicals, molybdenum sulfur, phosphorus and oxygen. It is believed that the primary difference is in the molybdenum bonding, therefore, the actual structural formula of the compositions of this invention or of those disclosed in the foregoing patents is not known with certainty.

The various materials disclosed in U.S. Pat. 3,400,140 and U.S. Pat. 3,402,188 and those of this invention are different as is shown by their respective infrared absorption patterns listed below in Table I expressed in cm.$^{-1}$. It is to be noted that in 3,400,140 the absorption pattern is expressed in microns. The following table converts these values to cm.$^{-1}$ for consistency purposes.

TABLE I

[Infrared absorption pattern in cm.$^{-1}$]

| Composition of this invention | U.S. Pat. 3,402,188 | U.S. Pat. 3,400,140 | | | |
|---|---|---|---|---|---|
| | | Ex. 1 | Ex. 2 | Ex. 3 | Ex. 4 |
| 2,960—S | 2,985—S | 2,950—S | 2,950—S | 2,950—S | 2,950—S |
| 2,930—M | 2,970—M | 1,460—M | 1,460—M-S | 1,460—M-S | 1,460—M-S |
| 2,880—M | 2,940—M | 1,380—M | 1,380—M | 1,380—M | 1,380—M |
| 1,465—S | 1,465—S | 1,175—M | 1,020—S | 1,150—W-M | 1,190—M |
| 1,385—S | 1,385—S | 1,100—W | 995—VS | 990—VS | 1,170—S |
| 1,370—M | 1,340—M | 980—VS | 980—S | 950—M | 980—M-S |
| 1,225—M | 1,175—W | 890—M | 850—M | 810—W | 945—S |
| 1,140—W | 990—S | 770—M-S | | 720—W | 920—S |
| 990—S | 825—S | 750—M | | | 850—M |
| 855—M | 655—S | 715—W-M | | | 830—S |
| 770—M | 585—M | | | | 785—M |
| 650—S | 385—W | | | | 670—W-M |
| 550—M | | | | | |
| 465—M | | | | | |
| 330—W | | | | | |

NOTE.—VS=Very strong; S=Strong; M=Moderate; W=Weak.

Although there are differences in the infrared absorption pattern at values above the 990 cm.$^{-1}$ peak, these differences are due to the particular hydrocarbons used and are not significant in this instance. The strong peaks at the 990 region is due to the C—O—P bond. At values below 990 cm.$^{-1}$ the molybdenum and sulfur bondings are shown. By obtaining infrared absorption patterns on known materials the following values are determined for various types of bonding as shown in Table 2 below:

Table 2

| Bond: | Value of peak cm.$^{-1}$ |
|---|---|
| Mo—O | 820 to 860 |
| P=S | 750 to 770 |
| ($^1$) | 650 to 670 |
| P—S—Mo | 540 to 590 |
| S—S | 400 to 500 |
| Mo—S | 300 to 400 |

$^1$ Formula: 
$$\begin{array}{c} P=S \\ | \\ S \\ | \\ Mo \end{array}$$

From the above infrared absorption patterns, it is shown that the compositions of this invention vary from those of the prior art, however, due to the number of possibilities of structure because of the varying valence state of oxymolybdenum radicals no exact structure is established. It is believed, however, that the material of this invention is established as an organo-molybdenum phosphorodithioate. The peaks that occur at and above 990 cm.$^{-1}$ establish the P—O— organic portion and the peaks below 990 cm.$^{-1}$ establish a "fingerprint" for those particular compositions, that is, the material of this invention have peaks at about the following values in the 300 to 850 cm.$^{-1}$ region. A strong peak at about 850 cm.$^{-1}$, moderate peaks at about 855 cm.$^{-1}$, 770 cm.$^{-1}$, 550 cm.$^{-1}$ and 465 cm.$^{-1}$ and a weak peak at about 330 cm.$^{-1}$.

For a better understanding of the present invention, together with other and further objects, advantages and capabilities thereof, reference is made to the following disclosure and appended claims in connection with the above description of the invention.

DESCRIPTION OF THE PREFERRED EMBODIMENTS

The weight percentage of the molybdenum content of the compounds can be varied depending upon the quantity of metal desired in the additive and will generally be dependent upon the ratio of molybdenum and the phosphorodithioic acid in their respective media. The compounds of this invention, therefore, enable a large degree of flexibility which was heretofore only achieved by blending of several additives.

Lubricating oils which can be used as the base oils to which the new compounds of this invention are added are not limited as far as the effectiveness of the compounds are concerned, therefore, lubricating oils which are of a naphthenic base, paraffinic base and other hydrocarbon bases, as well as lubricating oils derived from coal products and synthetic oils, such as the alkylene polymers, alkylene oxide polymers, dicarboxylic acid esters, alkylated benzene, silicate esters, silicon polymers and the like are suitable.

In the process of this invention any water soluble molybdenum source can be used, however, in most instances the alkali metal molybdates are preferred with sodium molybdate being especially preferred. As used herein, water-soluble means that at least about 0.1 gram of the material is dissolved in 100 cc. of water at 25° C.

In most instances, an aqueous medium having a molybdenum concentration of from about 10 grams of molybdenum per liter of solution to about 100 grams per liter of solution will be preferred. In some instances concentrations of as low as about 1 gram per liter can be used, however, these lower concentrations are not preferred since there are no additional beneficial results achieved from using the lower concentrations and the use of these low concentrations can create water disposal problems. Although concentrations greater than about 100 grams per liter can be used, such high concentrations can approach saturated solutions and the use of these concentrated solutions can result in yield losses or require the recycle of the aqueous medium. Concentrations of molybdenum in the aqueous media of from about 20 g./liter to about 40 grams/liter MoO$_3$ basis yields essentially quantitative extraction into the organic medium.

The concentration of the phosphorodithioic acid in the organic solvent should be between about 5% to about 90% by weight. Higher and lower concentrations, such as low as about 4% and as high as about 95% by weight can be used, however, the efficiency of the process is reduced, therefore, are not generally used.

The organic solvents that can be used in the practice of this invention are those which are immiscible with water, that is, those that have a solubility of less than 0.1 gram of solvent/100 cc. of water at 25° C. and have a boiling point less than 250° C. Organic aromatic solvents that are immiscible with water such as benzene, toluene, cumene, xylene, naphthalene and other petroleum fractions containing aromatic hydrocarbons that have boiling points below about 250° C. will normally be used. Because the solvent is subsequently separated, generally by distillation, it is preferred to use solvents that have relatively low boiling points, that is, below about 200° C., with solvents having a boiling point from about 60° C. to about 120° C. being especially preferred. If desired, cycloparaffins that have the foregoing desired properties can be used.

The amount of organic solution containing the phosphorodithioic acid that will be used will depend upon the amount of the molybdenum that is in the aqueous medium and the percentage of molybdenum that is desired in the product.

The phosphorodithioic acids which can be used in practice of this invention are well known in the lubricating art and in general contain two hydrocarbon radicals selected from the group consisting of alkyl, aryl and alkaryl and contain from about 1 to about 30 carbon atoms. As is known in the art, since the phosphorodithioic acids are often prepared from mixtures, the carbon chain length of the alkyl group is an average value and will be a mixture. For example, one of the preferred phosphorodithioic acids is one in which the hydrocarbon radicals are alkyl groups having an average chain length of about 5 carbon atoms. In some instances, however, relatively pure phosphorodithioic acids are produced, that is, those which are not mixtures but are relatively pure compounds, and these are also good raw materials. For example, one of the preferred raw materials is di-isooctyl phosphorodithioic acid.

In the process of this invention the heretofore described aqueous medium containing the molybdenum is adjusted to a pH of below about 7 with a pH of about 0 to about 4.5 being preferred. Any mineral acid can be used to adjust the pH, however, generally sulfuric acid and hydrochloric acid are the preferred acids because of their relatively low cost and availability. The heretofore described organic medium containing a phosphorodithioic acid and the aqueous medium are contacted for a sufficient time to remove at least some of the molybdenum from the aqueous media. In most instances the time required to extract at least some of the molybdenum is relatively short, that is, below 5 minutes. Essentially all of the molybdenum is extracted within about one hour under conditions where the contact between the two media is relatively intimate such as when the two media are mixed by mild agitation. The determination of the amount of molybdenum that has been extracted is relatively easy since the organic and aqueous media are immiscible. After a predetermined time of contact between the two media has occurred, the contact can be discontinued and since the two phases readily separate a sample of one of the phases can be analyzed for molybdenum. Generally, it is preferred to analyze a sample of the aqueous phase for molybdenum content to determine the extent of the extraction. If desired, an oxidizing agent such as hydrogen peroxide can be added to the mixture to aid in the visual observation of the interface between the aqueous and organic media. After the desired amount of molybdenum has been extracted into the organic phase the two phases can be separated by any conventional means for separating immiscible liquids. As can be appreciated, the process can be either batch or continuous depending upon the particular requirements of design that is preferred by the one desiring to practice this invention. After the separation of the aqueous and organic media, the organic solvent is removed from the organic media to thereby recover the molybdenum compounds of the present invention. In most instances distillation will be the preferred method to remove the organic solvent which can be recycled in the further production of the compounds of this invention.

To further illustrate the invention, the following non-limiting examples are presented. All parts, proportions, and percentages are by weight unless otherwise indicated.

EXAMPLE I

An aqueous solution of sodium molybdate having a concentration of 40 g. $MoO_3$/liter is acidified to a pH of about 2 with $H_2SO_4$ and contacted with equal volumes of various concentrations of phosphorodithioic acids in benzene. After settling, aliquots of both phases are analyzed and the distribution coefficients are calculated as a measure of Mo transfer from the aqueous to the organic phase.

[Kd = Percent molybdenum in organic phase, percent molybdenum in aqueous phase]

| Phosphorodithioic acid | Percent by volume acid in organic | Kd |
|---|---|---|
| A | 10 | .560 |
| B | 10 | .140 |
| A | 20 | 1.36 |
| B | 20 | -------- |
| A | 30 | 4.52 |
| B | 30 | -------- |
| A | 40 | 16.11 |
| B | 40 | 1.58 |

NOTE.—A = dialkyl phosphorodithioic acid wherein the alkyl radical is $C_5$ (mixture); B = Dialkly phosphorodithioic acid wherein the alkyl radical is $C_8$ (isooctyl).

EXAMPLE II

An aqueous solution of sodium molybdate having a concentration of 40 g. $MoO_3$/liter is acidified to a pH of about 2 with $H_2SO_4$. To aid in the subsequent separation, the aqueous medium is oxidized with hydrogen peroxide. Various concentrations of phosphorodithioic acid in benzene are contacted with equal volumes of the aqueous solution. After settling, aliquots of both phases are analyzed and the Kd's are calculated:

| Phosphorodithioic acid | Percent by volume acid in diluent | Kd |
|---|---|---|
| B | 50 | 48.58 |
|   | 60 | 91.64 |
|   | 70 | 124.74 |
|   | 80 | 114.13 |

NOTE.—B = Dialkyl phosphorodithioic acid wherein the alkyl radical is isooctyl.

EXAMPLE III

A series of aqueous solutions containing about 50, 100, 150, 200 grams of sodium molybdate/liter of solution, are prepared. Each acid is acidified to pH of about 2 with $H_2SO_4$. Solutions containing about 70% by volume of dithiophosphoric acid in benzene are contacted with equal volumes of the aqueous solution. After settling, the depleted or barren aqueous phases, commonly designated raffinate solutions are analyzed for $MoO_3$ for comparison to the starting aqueous solutions. Each solution is run in triplicate and the analyses of samples of the runs are shown below.

| Solution | Starting concentrate, g./l. $MoO_3$ | Raffinate solutions, g./l. $MoO_3$ | | | Average in organic, g./l. $MoO_3$ |
|---|---|---|---|---|---|
| 50 g./l. $Na_2MoO_4$ | 21.3 | 0.05 | 0.10 | 0.13 | 21.2 |
| 100 g./l. $Na_2MoO_4$ | 40.8 | 0.20 | 0.18 | 0.15 | 40.62 |
| 150 g./l. $Na_2NoO_4$ | 62.0 | 4.39 | 3.04 | 4.25 | 58.10 |
| 200 g./l. $Na_2MoO_4$ | 80.8 | 25.6 | 26.4 | 25.2 | 55.06 |

EXAMPLE IV

About 50 parts $Na_2MoO_4$ are dissolved in 500 ml. $H_2O$. Hydrogen peroxide is added and the solution is acidified to a pH of about 2 with $H_2SO_4$. The aqueous solution is contacted with an equal volume of a solution containing about 70% by volume of di-isooctyl phosphorodithioic acid in benzene. After settling, the aqueous riffinate is discarded and the benzene solvent is recovered by distillation under reduced pressure at 0.6 torr. The molybdenum salt is readily soluble in 10W motor oil. Tests were run to determine the molecular weight, the specific gravity and percent Mo, P, and S. The results are tabulated below:

|  | Actual percent by wt. |
|---|---|
| Mo | 5.88 |
| S | 16.36 |
| P | 6.14 |
| Mol. wt. | 742.27 |
| Sp. g. | 1.0826 |

The infrared spectrum of the compounds shows strong absorption peaks at about 650, 990, 1385, 1465, and 2960. Wave numbers are expressed in (cm.$^{-1}$). Moderate absorption peaks are found at 465, 550, 770, 855, 1225, 1370, 2880 and 2930 (cm.$^{-1}$) and a weak peak at 330 (cm.$^{-1}$). The foregoing infrared spectrum is run on a Perkin-Elmer double beam spectrophotometer.

EXAMPLE V

Samples of the materials produced in Examples I to IV above when added to 10W motor oil at a concentration of about 10% by volume of the molybdenum compounds formed no residue or sludge when heated in air at about 120° C. for about 72 hours. Additionally suitable products are obtained when other phosphorodithioic acids are substituted in substantially equal stoichiometric equivalent amounts for the dialkyl phosphorodithioic acids in the above examples. For example, the hydrocarbon radicals can be methyl, ethyl, 2-ethylhexyl, decyl, dodecyl, octadecyl and the like as well as the aromatics such as phenyl, amylphenyl, octylphenyl and the like. In each instance compounds are produced having properties which make them suitable as lubricating oil additives.

The new compounds of this invention are usually incorporated at levels of from about 0.1% to about 10% by weight of the total lubricating composition. The level used will depend upon the end use of the lubricating composition. For example, as an additive for motor oils normally used in internal combustion engines, low amounts such as from about 0.5% to about 5% by weight are employed while in lubricating greases the amount of additive can be as high as about 10% by weight.

While there has been shown and described what is at present considered the preferred embodiments of the invention, it will be obvious to those skilled in the art that various changes and modifications may be made therein without departing from the scope of the invention as defined by the appended claims.

1. A process for producing a dialkyl-molybdenum phosphorodithioate comprising:
(a) contacting an aqueous solution comprising water and a water-soluble molybdenum metal source, said aqueous solution being at a pH of below about 7, with an organic medium comprising a dialkyl phosphorodithioic acid dissolved in a water-immiscible organic solvent for a time sufficient to extract at least some of the molybdenum from said aqueous solution;
(b) separating said aqueous solution and said organic medium; and
(c) removing said organic solvent from said organic medium thereby recovering a dialkyl-molybdenum phosphorodithioate having the following infrared absorption pattern in cm.$^{-1}$ 2960-S, 2930-M, 2880-M, 1465-S, 1385-S, 1370-M, 1225-M, 1140-W, 990-S, 855-M, 770-M, 650-S, 550-M, 465-M and 330-W.

2. A process according to claim 1 wherein the concentration of molybdenum in said aqueous solution is from about 10 grams per liter to about 100 grams per liter and wherein the concentration of said phosphorodithioic acid in said medium is from about 5% to about 90% by weight and wherein said metal source is an alkali metal molybdate.

3. A process according to claim 2 wherein said organic solvent is benzene and wherein said phosphorodithioic acid is dipentyl phosphorodithioic acid.

4. A process according to claim 2 wherein said organic solvent is benzene and said phosphorodithioic acid is diisooctyl phosphorodithioic acid.

References Cited

UNITED STATES PATENTS

| 2,866,732 | 12/1958 | Hoff et al. | 260—429 R |
| 3,068,259 | 12/1962 | Hartle | 260—429 R |
| 3,400,140 | 9/1968 | Rowan et al. | 260—429 |
| 3,402,188 | 9/1968 | Wiese | 260—429 |

OTHER REFERENCES

Harwood Industrial Application of the Organometellic Compounds, Reinhold Publishing Corp., N.Y., 1963, p. 1319.

Lindoy et al., Aust. J. Chem. 1965, 18 pp. 1549, 56, 1559–60.

Spengler et al., Chem. Abst. 54 (1960) Col. 873.

Busev Chem. Abst. 43 (1954) col. 7859.

DANIEL E. WYMAN, Primary Examiner

A. P. DEMERS, Assistant Examiner

U.S. Cl. X.R.

252—32.7 R; 260—920

PO-1050
(5/69)

UNITED STATES PATENT OFFICE
CERTIFICATE OF CORRECTION

Patent No. 3,733,345          Dated  May 15, 1973

Inventor(s) Vincent Chiola, Phyllis R. Dodds and Tai K. Kim

It is certified that error appears in the above-identified patent and that said Letters Patent are hereby corrected as shown below:

Col. 2 - line 25 - "now" should read - - new - -.

Signed and sealed this 20th day of November 1973.

(SEAL)
Attest:

EDWARD M. FLETCHER, JR.            RENE D. TEGTMEYER
Attesting Officer                  Acting Commissioner of Patents